T. E. DAVIS.
MEASURING FAUCET.
APPLICATION FILED JUNE 7, 1913.

1,094,982.

Patented Apr. 28, 1914.

Witnesses:

Inventor
Thomas E. Davis
by Atty's

UNITED STATES PATENT OFFICE.

THOMAS E. DAVIS, OF CAMBRIDGE, MASSACHUSETTS.

MEASURING-FAUCET.

1,094,982.  Specification of Letters Patent.  Patented Apr. 28, 1914.

Application filed June 7, 1913. Serial No. 772,297.

*To all whom it may concern:*

Be it known that I, THOMAS E. DAVIS, a citizen of the United States, and a resident of Cambridge, in the county of Middlesex and State of Massachusetts, have invented certain new and useful Improvements in Measuring-Faucets, of which the following is a specification.

This invention relates to faucets for withdrawing measured charges of liquid from a reservoir so that each time the faucet is opened a predetermined quantity of liquid will be discharged.

The object of the invention is to provide a simple, durable and effective measuring faucet adapted to be adjusted to vary the quantity of liquid discharged.

The invention consists in the improvements which I will now proceed to describe and claim.

Figure 1:
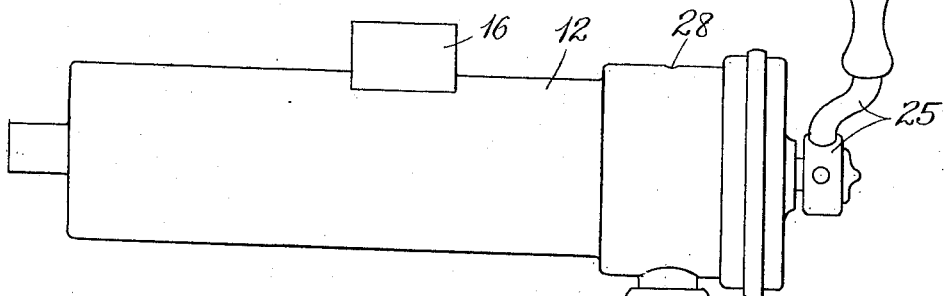
Figure 2:
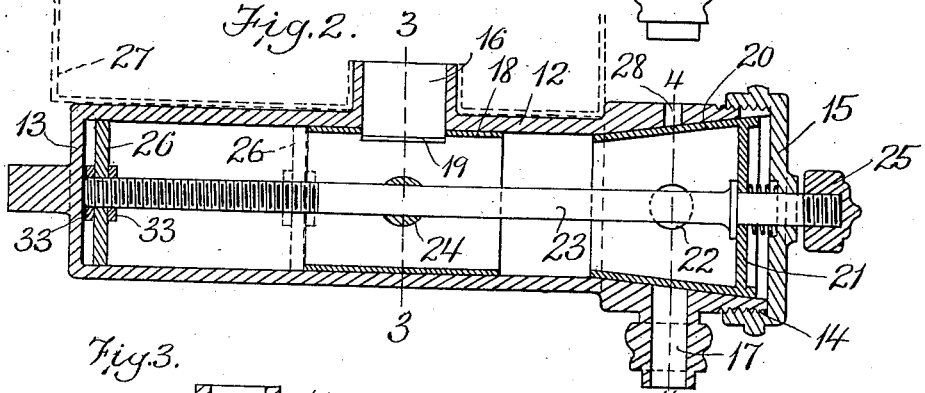
Figure 3:
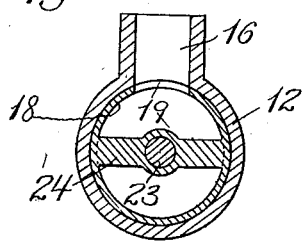
Figure 4:
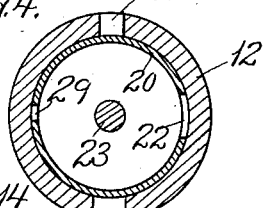
Figure 5:
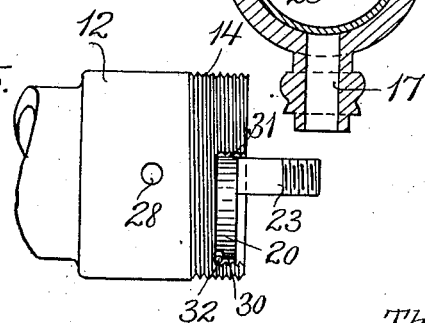

Of the accompanying drawings:—Figure 1 represents a side elevation of a measuring faucet embodying my invention. Fig. 2 represents a longitudinal section of the same. Fig. 3 represents a section on line 3—3 of Fig. 2. Fig. 4 represents a section on line 4—4 of Fig. 2. Fig. 5 represents a top plan view showing portions of the faucet, other portions being removed.

The same reference characters indicate the same parts in all the figures.

In the drawings:—12 represents a tubular measuring chamber permanently closed at its inner end by a head 13, and provided with an external screw thread 14 at its outer end adapted to engage an internal thread on a removable bonnet 15 which closes the outer end of the chamber.

16 represents an inlet practically equidistant from the ends of the chamber, and 17 represents an outlet at the outer end portion of the chamber.

18 represents an inner valve which is preferably a thin metal cylinder open continuously from end to end and provided with a port 19 adapted to register with the inlet 16, the periphery of the valve having a close sliding fit on the interior of the chamber 12.

20 represents an outer valve which is preferably a frusto-conical thin metal tube having a close sliding fit on a correspondingly formed seat in the outer end portion of the chamber, the outer end of the valve 20 being closed by a head 21. The valve 20 is provided with a port 22 adapted to register with the outlet 17.

The valves 18 and 20 are connected and caused to turn in unison by a stem 23, which is engaged with the head 21 of the outer valve and with a cross bar 24 attached to the inner valve 18. Said stem is extended outwardly through the head 21 and bonnet 15 and is provided with an operating handle 25 at its outer end. The stem 23 is extended inwardly to or nearly to the inner end of the chamber, and with this inwardly extended portion is adjustable engaged a piston-like head 26 having a close or liquid-tight sliding fit on the interior of the inner portion of the chamber. The head 26 is adjustable on the stem 23 so that it may occupy the position shown by full lines in Fig. 2 or the position shown by dotted lines in said figure, or any intermediate position. The head 26 constitutes in effect the inner end of the chamber so that the capacity of the chamber may be varied by adjusting the said head. Any suitable means may be provided for adjustably connecting the head with the sem 23. As here shown, the inwardly extended portion of the stem is screw-threaded to engage clamping nuts 33 bearing on opposite sides of the head 26.

The inlet 16 is preferably formed in a flange which projects from one side of the chamber 12 and is adapted to enter a portion 27 of a suitable liquid reservoir. The relative arrangement of the inlet 16, the outlet 17 and the ports 19 and 22 in the valves is such that when the port 19 registers with the inlet 16, the port 22 is out of register with the outlet 17 and vice versa. The chamber is preferably provided with an air inlet 28 and the valve 20 with the air port 29, these being so arranged that when the port 22 coincides with the outlet 17, the port 29 coincides with the air inlet 28, so that a free flow of liquid from the faucet is permitted.

The outer end portion of the chamber 12 is preferably cut away to form a recess having ends 30 and 31 (Fig. 5) which constitutes stops coöperating with a stud 32 on the outer valve 20 in limiting the turning movements of the valves.

I claim:—

1. A measuring faucet comprising a measuring chamber having an inlet intermediate of its ends and an outlet at its outer portion, a valve controlling said inlet, a valve controlling the outlet, a stem to which both valves are connected whereby they may be rotated in unison, and a head adjustably connected to said stem and having a sliding liquid-tight fit on the wall of the chamber.

2. A measuring faucet comprising a measuring chamber having an inlet intermediate of its ends and an outlet at its outer portion, a valve controlling said inlet, a valve controlling the outlet, a stem to which both valves are connected whereby they may be rotated in unison, said stem being threaded, and a head having a threaded opening to receive said stem, said head having a sliding liquid-tight fit on the wall of the chamber.

In testimony whereof I have affixed my signature, in presence of two witnesses.

THOMAS E. DAVIS.

Witnesses:
C. F. BROWN,
P. W. PEZZETTI.